United States Patent [19]

Prier

[11] Patent Number: 4,634,743

[45] Date of Patent: Jan. 6, 1987

[54] NOVEL POLYETHER POLYCARBONATE BLOCK COPOLYMERS AND POLYURETHANES PREPARED THEREFROM

[75] Inventor: Donald G. Prier, Baton Rouge, La.

[73] Assignee: The Dow Chemical Company, Midland, Mich.

[21] Appl. No.: 731,176

[22] Filed: May 6, 1985

Related U.S. Application Data

[63] Continuation of Ser. No. 525,523, Aug. 22, 1983, abandoned.

[51] Int. Cl.$^4$ .............................................. C08F 69/00
[52] U.S. Cl. ................... 525/462; 525/403; 525/409; 525/394; 525/433; 525/439; 525/535; 525/537; 527/300; 527/400; 528/370
[58] Field of Search ............. 525/433, 439, 462, 467, 525/535, 409, 394, 537; 528/370; 260/463; 527/300, 400

[56] References Cited

U.S. PATENT DOCUMENTS

| | | | |
|---|---|---|---|
| 3,072,613 | 1/1983 | Whelan, Jr. ................. | 260/77.5 |
| 3,133,113 | 5/1964 | Malkemus ..................... | 260/463 |
| 3,248,414 | 4/1966 | Stevens ........................ | 260/463 |
| 3,313,782 | 4/1967 | Springmann et al. ......... | 260/77.5 |
| 3,379,693 | 4/1968 | Hostettler et al. ............ | 260/77.5 |
| 3,689,462 | 9/1972 | Maximovich ................. | 260/77.5 D |
| 3,896,090 | 7/1975 | Maximovich ................. | 260/77.5 D |
| 4,072,704 | 2/1978 | Langdon ...................... | 260/463 |
| 4,105,641 | 8/1978 | Buysch et al. ............... | 526/712 |
| 4,131,731 | 12/1978 | Lai et al. ..................... | 528/370 |
| 4,330,481 | 5/1982 | Timberlake et al. .......... | 260/463 |

OTHER PUBLICATIONS

Chem. Abst., 88, 1978, p. 33 (153477c).

*Primary Examiner*—Theodore E. Pertilla

[57] ABSTRACT

The invention is a block copolymer useful in the preparation of polyurethanes. The polyether polycarbonate block copolymer comprises (a) the residue of a hydrocarbon or a hydrocarbyloxy hydrocarbon compound containing 3 or more functional groups with active hydrogens;

(b) an alkylene polyether, polyamine, polyamide, polyaromatic carbonate, polyester, aromatic polyether, polyimide, polysulfide, polysulfone or polysaccharide block wherein such block is bonded to the residue of each active hydrogen-containing functional group; and (c) a polyether polycarbonate block which comprises ether and carbonate ether units arranged in random order, wherein the polyether polycarbonate blocks are bonded to the blocks defined in (b).

33 Claims, No Drawings

NOVEL POLYETHER POLYCARBONATE BLOCK COPOLYMERS AND POLYURETHANES PREPARED THEREFROM

CROSS-REFERENCE TO RELATED APPLICATION

This is a continuation of application Ser. No. 525,523, filed Aug. 22, 1983, now abandoned.

BACKGROUND OF THE INVENTION

This invention relates to novel polyether polycarbonate block copolymers and to polyurethanes derived from the block copolymers.

Polyether polyols are well-known polymers which can be further polymerized with organic polyisocyanates to prepare polyurethanes. Polyether polyols are prepared by the reaction of hydroxy-containing hydrocarbons, such as an aromatic or aliphatic diol and epoxides, for instance ethylene oxide and propylene oxide.

It is known to prepare polycarbonates from aliphatic dihydroxyl compounds either by a process of phosgenation in which hydrogen chloride is liberated or bound by bases, such as pyridine or quinoline, or by a process of transesterification with carbonic acid esters of alcohols or phenols, preferably diphenylcarbonate, optionally with the aid of transesterification catalysts.

In either case, it is essential to use phosgene or a mixture of carbon monoxide and chlorine as source of carbonic acid. Technical processes which involve the preparation and handling of phosgene are difficult and costly on account of the considerable safety risks involved and the high cost of materials due to corrosion. To this are added ecological problems since either the spent air is contaminated with hydrogen chloride or the effluent water with sodium chloride.

Polycarbonates produced by these methods may have a functionality of less than two due to inadequate or incomplete esterification or transesterification which often prevents the products from forming high molecular weight polymers in subsequent reactions.

One method for preparing polycarbonates is illustrated by Malkemus, U.S. Pat. No. 3,133,113. It is disclosed that an alkylene carbonate such as ethylene carbonate can be reacted with a glycol such as diethylene glycol in a mole ratio in the range of 1.2:1 to 2.5:1 at reduced pressure while removing ethylene glycol formed by the reaction until the reaction in complete. The catalyst employed is a mixed zinc borate-alkaline earth metal oxide catalyst.

Stevens, in U.S. Pat. No. 3,248,414; 3,248,415 and 3,248,416, discloses the preparation of polycarbonates from: (1) carbon dioxide and 1,2-epoxides; (2) cyclic carbonates such as ethylene carbonate; or (3) from cyclic carbonates and a 1,2-epoxide. A minor amount of a polyol is employed as an initiator. The reaction is usually conducted under pressure in the presence of a metal carbonate, metal hydroxide, trisodium phosphate or a tertiary amine.

Polycarbonates have also been prepared by polymerization of ethylene carbonates under pressure using basic catalysts and a minor amount of glycol as initiator. These products are low in carbonate and high in ether groups concentration due to decomposition of the ethylene carbonate.

In the processes described above, the products are polymers of relatively low molecular weight with a broad molecular weight range. Also, certain polyols which are often used as initiators, for example sucrose, undergo oxidation when exposed to the polymerization conditions used in the preparation of polycarbonates. The presence of these oxidized products often results in color in the resin prepared. The presence of color in such polycarbonates is undesirable for many uses.

What is needed is a polycarbonate which is multifunctional which also has a high molecular weight and relatively narrow molecular weight distribution. What is further needed is a polycarbonate which does not contain color-causing by-products. Polycarbonates which have good flame retardancy, thermal stability and load bearing properties are desirable. Further desirable are polycarbonates with relatively high carbonate content.

SUMMARY OF THE INVENTION

The invention is a polyether polycarbonate block copolymer comprising (a) the residue of a hydrocarbon or a hydrocarbyloxy hydrocarbon compound containing 3 or more functional groups with active hydrogens;

(b) an alkylene polyether, polyamine, polyamide, polyaromatic carbonate, polyester, aromatic polyether, polyimide, polysulfide, polysulfone or polysaccharide block wherein such block is bonded to the residue of each active hydrogen-containing functional group; and (c) a polyether polycarbonate block which comprises ether units and carbonate ether units arranged in random order, wherein the polyether polycarbonate blocks are bonded to the blocks defined in (b).

Another aspect of this invention are bridged polyether polycarbonate block copolymers in which two or more polyether polycarbonate block copolymers are bonded together through a carbonyl moiety.

The polyether polycarbonate block copolymers of this invention are useful in the preparation of polyurethanes. In one aspect, this invention involves a polyurethane composition comprising the reaction product of (a) an organic polyisocyanate and (b) a polyether polycarbonate block copolymer. The polyurethane composition may also comprise the reaction product of (a) an organic polyisocyanate, (b) a polyether polycarbonate block copolymer, and (c) a polyahl.

The polyether polycarbonate block copolymers of this invention are advantageously multifunctional polyols which have high molecular weights. Such block copolymers give excellent cross-linked polyurethane products which have excellent load-bearing properties. Such block copolymers do not suffer from the problems caused by color-causing impurities. The molecular weight distributions are relatively narrow. Further, the block copolymers contain a high carbonate content, and the process of this invention allows control of the carbonate content. The block copolymers of this invention have good thermal stability and flame retardant properties.

DETAILED DESCRIPTION OF THE INVENTION

The polyether polycarbonate block copolymers of this invention include those which correspond to the formula

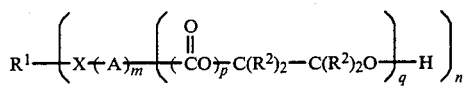

or

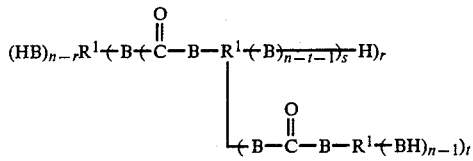

wherein

A is an alkylene ether, amide, amine, aromatic carbonate, ester, imide, sulfide, sulfone or saccharide monomer unit;

B is

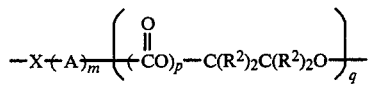

with the proviso that X is always bonded to $R^1$;

$R^1$ is separately in each occurrence an n valent hydrocarbon radical or hydrocarbyloxy hydrocarbon radical;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyl dioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is S, O, NH,

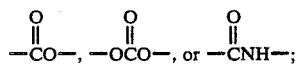

m is separately in each occurrence an integer of from 1 to 200;

n is separately in each occurrence an integer of from 3 to 25;

p is separately in each occurrence 0 or 1;

q is separately in each occurrence an integer of 1 or greater;

r is separately in each occurrence an integer of from 1 to 25;

s is separately in each occurrence an integer of from 1 to 20; and t is separately in each occurrence an integer of from 0 to 24.

Polyether polycarbonate block refers herein to one or more ether units and carbonate ether units arranged in random order, wherein the polyether polycarbonate block is bonded to the reactive end of an alkylene polyether, polyamide, aromatic polycarbonate, polyester, aromatic polyether, polyimide, polysulfide, polysulfone or polysaccharide block, and the other end of the polyether polycarbonate block terminates in a hydroxyl group.

Ether unit herein refers to a substituted or unsubstituted alkylene moiety bonded to an oxygen, and generally corresponds to the formula $-C(R^2)_2-C(R^2)_2-O-$ wherein $R^2$ is as described above. Carbonate ether unit refers herein to a unit in which a carbonyl group is bonded to an ether unit, and generally corresponds to the formula

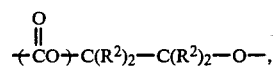

where $R^2$ is as defined above.

Unit as used herein describes the repeating unit of a polymer. Alkylene ether unit refers herein to the repeating unit of a alkylene polyether which generally corresponds to the formula $-R^3-O-$ wherein $R^3$ refers to a divalent $C_{1-20}$ hydrocarbon radical.

An amide unit refers herein to the repeating unit of a polyamide and generally corresponds to one of the formulas

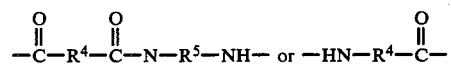

wherein $R^4$ and $R^5$ are separately in each occurrence, a divalent $C_{1-20}$ hydrocarbon radical. Aromatic carbonate unit refers herein to the repeating unit of a aromatic polycarbonate which generally corresponds to the formula

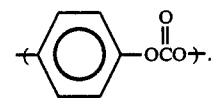

Aromatic ether unit refers herein to the repeating unit of an aromatic polyether, which generally corresponds to the formula

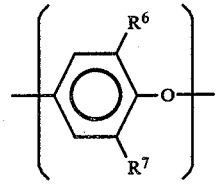

wherein $R^6$ and $R^7$ are separately in each occurrence a $C_{1-20}$ hydrocarbyl group. Imide monomer unit refers herein to the repeating unit of a polyimide, examples of polyimides may be found in Kirk-Othmer, *Encyclopedia of Chemical Technology*, 3rd Ed., Vol. 18, pp. 704–719, incorporated herein by reference. Sulfide monomer unit refers herein to the repeating unit of a polysulfide and generally corresponds to the formula $-R^8-(S)_x-R^9-$ wherein $R^8$ and $R^9$ are separately in each occurrence a divalent $C_{1-20}$ hydrocarbon radical or $C_{1-20}$ hydrocarbyloxy hydrocarbon radical and X is an integer of 1 or greater. A sulfone monomer unit refers herein to the repeating unit of a polysulfone and corresponds generally to the formula

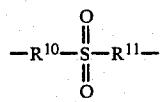

wherein $R^{10}$ and $R^{11}$ are separately in each occurrence a divalent $C_{1-20}$ hydrocarbon radical. Saccharide monomer unit refers herein to the repeating unit of a polysaccharide. Examples of such monomer units are the residue of cellulose, starch, lignin and the like.

Ester monomer unit herein refers to the repeating unit of a polyester and generally corresponds to the formula

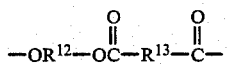

wherein $R^{12}$ and $R^{13}$ are separately in each occurrence a divalent $C_{1-20}$ hydrocarbon radical.

The polyether polycarbonate block copolymers of this invention are prepared in two stages. First, the polyalkylene ether, polyamide, aromatic polycarbonate, polyester, polyimide, polysulfide, polysulfone or polysaccharide block is prepared (hereinafter referred to as first stage product). This block is prepared by reacting a suitable initiator with a sufficient amount of a reactant which provides between about 1 and 200 of the units described above per reactive hydrogen-containing moiety on the initiator, preferably between 1 and 75, and more preferably between about 3 and 50, that is m is preferably between about 1 and 75 and more preferably between 3 and 50. These polymerization reactions are well-known in the art. Such polymerization reactions are described in Kirk-Othmer, *Encyclopedia of Chemical Technology*, 3rd Ed., Vol. 18, (relevant portions incorporated herein by reference), for polyamides see pages 328 et seq.; for polyimides see pages 704 et seq.; for polycarbonates see pages 479 et seq.; for polyesters see pages 549 et seq.; for polyethers see pages 594 et seq.; for polysulfides see pages 814 et seq.; for polysulfones see pages 832 et seq. This first stage product has terminal functional groups which contain reactive hydrogens wherein the number of such terminal functional groups is equal to the number of functional groups containing reactive hydrogens on the initiator.

The initiator is a hydrocarbon or hydrocarbyloxy hydrocarbon containing between 3 and 25 functional groups containing a reactive hydrogen. Among the desirable hydrocarbon compounds are those which correspond to formula III $$R^1\text{---}XH)_n \qquad \text{III}$$

wherein
$R^1$ is separately in each occurrence an n valent hydrocarbon or hydrocarbyloxy hydrocarbon radical;
X is separately in each occurrence S, O, NH,

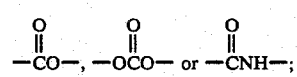

and
n is an integer of from 3 to 25, inclusive.
A functional group containing a reactive hydrogen means herein any moiety which contains a hydrogen atom which will readily liberate the hydrogen atom and react with one of the units described above. More specifically, reactive hydrogen means herein a hydrogen linked directly to an oxygen, nitrogen or sulfur atom, such as is found in a hydroxy, non-tertiary amine, amide, mercapto or carboxyl group. Hydrocarbyloxy hydrocarbon refers herein to a hydrocarbon radical containing one or more oxy or ether linkages.

$R^1$ is preferably an n valent aliphatic or cycloaliphatic radical. $R^1$ is more preferably an n valent alkane or cycloalkane, and most preferably an n valent $C_{1-10}$ alkane. X is preferably O, S or NH.

The initiators of this invention contain three or more of the following functional groups, hydroxyls, amines, mercaptans, carboxyls, sulfones, amides, imides, or carbonates.

Among desirable initiators are polyols such as aliphatic polyols, cycloaliphatic polyols, aromatic polyols and polyols which further contain oxy or ether groups, polyamines; polymercaptans; polyamides, polycarboxylic acids; alkylolamines and organic compounds which contain three or more of the above-described functional groups containing reactive hydrogens. Examples of suitable triols include glycerol, trimethylol ethane and trimethylol propane. An example of a tetrol is pentaerythritol.

The preferred classes are the polyols, polyamines and polymercaptans.

In the initiator described by formula III, n is preferably between about 3 to 10 inclusive, and most preferably between about 3 to 5.

In one preferred embodiment, the preferred monomer unit is an alkylene ether unit which is derived from an alkylene oxide. Such ether unit is a substituted or unsubstituted ethylene moiety which is bonded to oxygen atoms. These units generally correspond to the formula $-\!\!\left(C(R^2)_2\!-\!C(R^2)_2O\right)\!\!-$ wherein $R^2$ is as defined above.

In this preferred embodiment, the polyether polycarbonate block copolymers correspond to the formulas

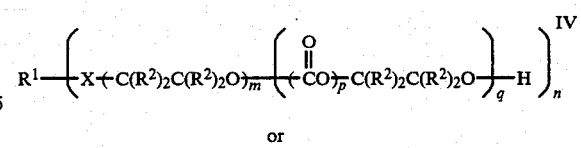

or

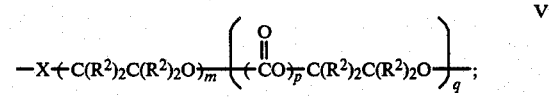

wherein B is $$-X\text{\tiny+}C(R^2)_2C(R^2)_2O\text{\tiny)}_{\overline{m}}\!\!\left(\text{\tiny+}CO\text{\tiny)}_{\overline{p}}C(R^2)_2C(R^2)_2O\text{\tiny)}_{\overline{q}}\!\!; \qquad V$$

with the proviso that X is always bonded to $R^1$ wherein $R^1$, $R^2$, m, n, p, q, r, s and t are as described above.

The polyether polyol comprises the residue of the initiator, that is the initiator without the active hydrogen, and in place of each hydrogen is the residue of one or more of the epoxides, or ether units, wherein the chain of the ether units terminates in a reactive hydroxyl moiety. One carbon on the alkylene group is bonded to the functional group on the hydrocarbon or an oxygen from another ether unit. The other carbon in the ethylene chain is bonded to the oxygen from the oxirane, wherein the oxygen is either bonded to another ether unit or to a hydrogen atom to form a reactive hydroxyl group. Reactive hydroxyl group means herein a hydroxyl group which will undergo reaction with an alkylene carbonate. These polyether polyols can have a wide range of molecular weights. Preferably molecular weights are between about 100 and 50,000, preferably between about 100 and 10,000.

The polyether polyols herein include those corresponding to formula VI

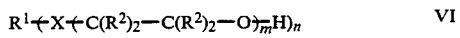

wherein $R^1$, X, m and are as defined above. Preferably, m is between about 1 and 75 inclusive, more preferably between about 3 and 50 inclusive.

In this preferred embodiment described hereinbefore, the first block is a polyether polyol comprising the reaction product of the initiator and between about 1 and 200 epoxides per functional group containing a reactive hydrogen.

Epoxides useful in this invention are those which will react with a functional group on an initiator with an active hydrogen to add an ether unit to the initiator.

Desirable epoxides include those corresponding to formula VII

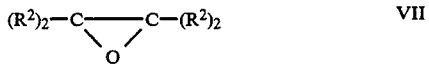

wherein $R^2$ is separately in each occurrence hydrogen, halogen, a nitro group, a cyano group or a monovalent hydrocarbon $C_{1-20}$ or a monovalent hydrocarbon $C_{1-20}$ substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group.

$R^2$ is preferably hydrogen, or a monovalent $C_{1-20}$ alkane, $C_{1-20}$ haloalkane, $C_{1-20}$ alkene or benzene radical. $R^2$ is more preferably hydrogen, or a monovalent $C_{1-3}$ alkane, $C_{2-3}$ alkene or benzene radical. $R^2$ is most preferably hydrogen, or a monovalent methane or ethane.

Among desirable epoxides are the alkylene oxides, for instance ethylene oxide, propylene oxide, butylene oxide; epihalohydrins, such as epibromohydrin and epichlorohydrin; styrene oxide, vinylene oxide, cyclohexene oxide; cyclopentene oxide, cycloheptene oxide, 2,3-epoxy propylphenyl ether and tert-butyl glycidal ether. Among preferred epoxides are ethylene oxide, propylene oxide, epichlorohydrin, epibromohydrin, styrene oxide and vinylene oxide.

In the second stage of preparation of the polyether polycarbonate block copolymers of this invention the reaction product of the initiator and the alkylene ether, amide, aromatic carbonate, ester, imide, sulfide, sulfone or saccharide monomer units, (hereinafter referred to as first stage product) are reacted with one or more alkylene carbonate per reactive group on the first stage product.

Alkylene carbonates useful in the reaction are those which will react with the reactive hydrogen-containing functional groups of the first stage product. Desirable alkylene carbonates are those corresponding to formula VIII

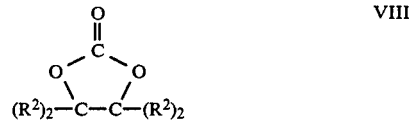

wherein $R^2$ is defined above.

Examples of desirable alkylene carbonates include ethylene carbonate, propylene carbonate, butylene carbonate, vinylene carbonate and phenylene carbonate. Most preferred alkylene carbonates include ethylene and propylene carbonate.

Hydrocarbon means herein an organic compound containing carbon and hydrogen atoms. The term hydrocarbon includes the following classes of organic compounds: alkanes, alkenes, alkynes, cycloalkanes, cycloalkenes, aromatics, aliphatics and cycloaliphatics, aralkanes and alkylaromatics. Aliphatic refers herein to straight- and branched-, and saturated and unsaturated, hydrocarbon chains, that is, alkanes, alkenes or alkynes. Cycloaliphatic refers herein to saturated and unsaturated cyclic hydrocarbons, that is, cycloalkenes and cycloalkanes. The term aromatic refers herein to benzenes, naphthalenes, phenanthranes, anthranes and aromatic groups bridged by an alkylene group. Alkylaromatic refers herein to alkyl-, alkenyl- or alkynyl-substituted aromatics wherein aromatic is as defined hereinbefore. Aralkane means herein an alkane, alkene or alkyne substituted with an aromatic substituent wherein aromatic is as defined hereinbefore.

In the embodiment wherein the first stage product is a polyether polyol, the polyether polyol is prepared by a process which comprises contacting a hydrocarbon containing between 3 and 25 functional groups with active hydrogens with between about 1 and 200 moles of epoxide per functional group on the hydrocarbon in the presence of a catalytic amount (about 0.1 to 10 weight percent) of base under conditions such that a polyether polyol is prepared, wherein the polyether polyol has the same number of reactive hydroxyl groups as the number of functional groups on the hydrocarbon. Included among suitable catalysts are alkali metal hydroxides, alkaline earth metal hydroxides, alkali metal carbonates, alkaline earth metal carbonates, ammonium hydroxide and ammonium carbonate. The reaction temperature is usually between about 50° and 250° C. This process is usually run at superatmospheric pressure. It is preferable to use pressure to keep the alkylene oxide in the liquid state. This is done in an inert atmosphere.

In the second stage, the first stage product is contacted with an alkylene carbonate to prepare the polyether polycarbonate block copolymer. Generally, the polyether polycarbonate block copolymer is prepared by contacting the first stage product with one or more moles of alkylene carbonate per reactive hydrogen under conditions such that a polyether polycarbonate is prepared. It is advantageous to use an ester exchange catalyst for such polymerization.

Basic and neutral ester exchange catalysts are preferred with the basic ester exchange catalysts more preferred.

The block copolymer so prepared comprises (a) the residue of a hydrocarbon compound containing functional groups with active hydrogens;

(b) an alkylene polyether, polyamine, polyamide, polyaromatic carbonate, polyester, aromatic polyether, polyimide, polysulfide, polysulfone or polysaccharide block wherein such block is bonded to the residue of each functional group with (c) an active hydrogen containing polyether polycarbonate blocks which comprises ether units and carbonate ether units arranged in random order, wherein the polyether polycarbonate blocks are bonded to the blocks defined in (b).

Specifically, the hydrocarbon residue is bonded to between 3 and 25 of the blocks defined in (b), and these blocks are further bonded to polyether polycarbonate blocks (c) comprising randomly arranged ether and ether carbonate units.

The polycarbonate block terminates in either a reactive hydroxy or is further bonded to a carbonyl group, wherein said carbonyl group is further bonded to another polyether polycarbonate block copolymer. It has been discovered that the carbonate portion of an alkylene carbonate can react simultaneously with two polyether polycarbonate block copolymers. In fact, up to twenty or more polyether polycarbonate block copolymers can be linked by carbonyl bridges through this process. These bridged polymers result in polymers with more reactive hydroxyl units on the macromolecule than the unbridged copolymers contain. Such added functionality is advantageous when the bridged copolymers are used in the preparation of polyurethane foams as they have more reactive sites for cross-linking. The bridged copolymers are prepared under the same conditions that the polyether polycarbonate block copolymers are prepared. In fact, in the above-described process, the polyether polycarbonate block copolymers and the bridged copolymers are co-produced.

Generally, the polyether polycarbonate block copolymers prepared have molecular weights between about 150 and several million, preferably between about 300 and one million, and most preferably between about 500 and 15,000.

Formula I hereinbefore represents the polyether polycarbonate block copolymers which are unbridged, while formula II hereinbefore represents the bridged polyether polycarbonate block copolymers. In such formulas, preferably q is an integer of between about 1 and 1000 inclusive, more preferably between about 1 and 500 inclusive. Preferably s is an integer of between about 1 and 10 inclusive, preferably between about 1 and 4 inclusive. Preferably t is an integer of between about 0 to 9 inclusive, more preferably between about 0 and 4 inclusive.

Generally, a mole of the first stage product is reacted with one or more moles of alkylene carbonates per reactive functional group containing a reactive hydrogen preferably between about 1 and 1000 moles alkylene carbonate per reactive hydrogen-containing moiety, more preferably between about 1 and 500 moles. The reaction of alkylene carbonate with the first stage reaction product will continue as long as alkylene carbonate is present. Generally, excess alkylene carbonate is used as a solvent for the first stage reaction product.

Suitable catalysts for the reaction of the first stage product and an alkylene carbonate include ester exchange catalysts. Among suitable catalysts are such metals as lithium, sodium, potassium, rubidium, cesium, magnesium, calcium, strontium, barium zinc, aluminum, titanium, cobalt, germanium, tin, lead, antimony, arsenic and cerium as well as the alkoxides thereof. Examples of other suitable catalysts are alkali metal carbonates, alkaline earth metal carbonates, ammonium carbonates, alkali metal borates, alkaline earth metal borates, ammonium borates, hydrocarbyloxy titanates, zinc borate, lead borate, zinc oxide, lead silicate, lead arsenate, litharge, lead carbonate, antimony trioxide, germanium dioxide, cerium trioxide and aluminum esopropoxide. Examples of other suitable catalysts include salts of organic acids of magnesium, calcium, cerium, barium, zinc and titanium, alkali metal stannates, alkaline metal stannates and ammonium stannates.

Examples of borate catalysts include sodium metaborate, sodium meta-borate tetrahydrate, sodium metaborate dihydrate, sodium pentaborate pentahydrate, sodium tetraborate decahydrate, sodium tetraborate pentahydrate, diammonium tetraborate tetrahydrate, ammonium hydrogen tetraborate tetrahydrate, lithium ortho-dihydroborate, lithium meta-borate, lithium tetraborate, lithium pentaborate pentahydrate, potassium meta-borate, potassium tetraborate tetrahydrate, potassium tetraborate pentahydrate, potassium pentaborate tetrahydrate, magnesium meta-borate trihydrate, magnesium diborate, magnesium ortho-borate, calcium meta-borate, calcium tetraborate and strontium tetraborate tetrahydrate. Examples of stannate catalysts include sodium stannate trihydrate, potassium stannate trihydrate, potassium stannate monohydrate, barium stannate trihydrate, magnesium stannate trihydrate and the like.

Preferred catalysts are the alkali metal carbonates, alkaline earth metal carbonates, ammonium carbonates, alkali metal stannates, alkaline earth metal stannates, alkali metal borates, alkaline earth metal borates and ammonium borates. More preferred catalysts are alkali metal carbonates, alkali metal borates and alkali metal stannates. Most preferred catalysts are potassium carbonate, sodium meta-borate and sodium stannate.

The choice of catalyst affects the percentage of carbonate ether units in the polycarbonate block. Generally, the polyether polycarbonate block contains between about 10 and 40 percent of carbonate ether units. In this context, percent means the percentage of the carbonate ether units based on the total of the carbonate ether units and the ether units. The use of most of the catalysts described hereinbefore results in a polycarbonate block in which about 10 percent of the units are carbonate ether units, whereas the use of sodium meta borate results in about 25 percent carbonate ether units, and the use of sodium stannate results in about 35 percent carbonate ether units.

A suitable amount of the catalyst is any amount which is catalytic under the reaction conditions. Preferable catalyst concentrations are between about 0.01 and 5 percent by weight based upon the reactants, more preferably between about 0.01 to 1.0 percent by weight, and most preferably 0.05 to 0.1 percent by weight.

Any temperature at which the polymerization proceeds is suitable. Preferable temperatures are between about 90° C. and 250° C., more preferably between about 125° C. and 200° C., even more preferable temperatures are between about 150° C. and 180° C., and most preferable temperatures are between about 165° C. and 175° C.

It is highly desirable to run the reaction under an inert atmosphere, i.e., under nitrogen. $CO_2$ is evolved during this process.

After the polymerization is complete, the polyether polycarbonate block copolymer is dissolved in sufficient ketone to form a 15 to 30 percent by weight solution preferably a 20 to 25 percent by weight solution. The solution is allowed to stand at room temperature for between about 5 minutes and 20 hours, more preferably between about 1 and 2 hours. During such time, most of the base precipitates out and may be removed by filtration. If not all of the basic catalyst have been removed, then between about 5 and 25 weight percent based upon the polyether polycarbonate block copolymer of a suitable adsorbent is stirred in the ketone solution for between about 5 minutes and 20 hours at about room temperature to remove the remainder of the base. A suitable adsorbent is one which adsorbs the base, for example, magnesium silicate. The adsorbent is removed by filtration.

Thereafter the ketone is stripped off by known method, for example, with a rotary evaporator. The polyether polycarbonate block copolymer is then dried to substantially anhydrous condition by heating the copolymer to between about 100° C. and 120° C. while flushing the copolymer with an inert gas such as nitrogen.

The polyether polycarbonate block copolymers generally have relatively high molecular weights with multiple functionalities. High molecular weights and multiple functionalities are advantageous when these copolymers are used in the preparation of polyurethanes, as such polyurethanes have better load bearing properties.

In general, the polyether polycarbonate block copolymers have narrower molecular weight distributions. In particular, the nonbridged copolymers have a narrow molecular weight range. The copolymers demonstrating a polymodal molecular weight distribution wherein the molecular weight modes are generally around multiples of the molecular weight of the nonbridged block copolymer.

The polyether polycarbonate block copolymers of this invention exhibit superior color properties.

The polyether polycarbonate block copolymers of this invention are useful in the preparation of polyurethanes. In one aspect, this invention involves a polyurethane composition comprising the reaction product of (a) an organic polyisocyanate and (b) a polyether polycarbonate block copolymer. The polyurethane may also comprise the reaction product of (a) an organic polyisocyanate, (b) a polyether polycarbonate block copolymer, and (c) a polyahl (polyahl is defined hereinafter). In this latter embodiment, the organic polyisocyanate is reacted with a mixture of a polyether polycarbonate block copolymer and a polyahl.

The polyether polycarbonate block copolymers which are useful in polyurethanes are those described hereinbefore, for example, those described by the foregoing formulas I and II.

The polyurethanes of this invention are prepared by a process which comprises contacting an organic polyisocyanate with a polyether polycarbonate block copolymer, and optionally a polyahl, in the presence of a catalytic amount of a polyurethane catalyst under conditions such that a polyurethane is prepared. Such catalysts and conditions are well-known to those skilled in the art. See, for example, *Polyurethanes: Chemistry and Technology I. Chemistry,* Saunders and Frisch, Interscience (1962).

The polyurethane prepared using polyether polycarbonate block copolymers are useful in foams, moldable compositions, films, coatings and the like.

Any of the aforementioned polyether polycarbonate block copolymers is readily reacted with an organic polyisocyanate to form the desired polyurethane products using conventional polyurethane reaction conditions and procedures. Such reaction and procedures are optionally carried out in the presence of chain extending agents, catalysts, surface active agents, stabilizers, blowing agents, fillers and/or pigments. In the preparation of foamed polyurethane, suitable procedures for the preparation of same are disclosed in U.S. Pat No. R. 24,514, which is incorporated herein by reference. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyether polycarbonate block copolymers of the present invention to prepare a prepolymer having free isocyanate groups which is then reacted in a second step with water to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorofluoroethane, vinylidene chloride and methylene chloride may be used as blowing agents.

The foams may also be prepared by the froth technique as described in U.S. Pat. Nos. 3,755,212; 3,849,156 and 3,821,130 which are also incorporated herein by reference.

Organic polyisocyanates which may be employed include aromatic, aliphatic and cycloaliphatic polyisocyanates and combinations thereof. Representative of these types are the diioscyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed in U.S. Pat. No. 3,215,652.

The polyahl suitably employed in this invention includes any organic compound having at least two active hydrogen moieties. Preferably, the compound has a number average molecular weight ($M_n$) of at least 62. More preferably the polyahl is a polymer having at least two active hydrogen moieties, an $M_n$ of at least 200 and at least three repeating units of a monomeric moiety. For the purposes of this invention, an active hydrogen moiety refers to a moiety containing a hydrogen atom which, because of its position in the molecule, displays significant activity according to the Zerewitnoff test described by Woller in the *Journal of the American Chemical Society*, Vol. 49, p. 3181 (1927). Illustrative of such active hydrogen moieties are —COOH, —OH, —NH$_2$, =NH, —CONH$_2$, —SH and —CONH—. Typical polyahls include polyols, polyamines, polyamides, polymercaptans, polyacids and the like, particularly as exemplified in U.S. Pat No. 4,390,645 (incorporated herein by reference).

The polyether polycarbonate block copolymers of this invention are preferably employed in combination with other polyahls commonly employed in the art. Accordingly, any of the polyahls which are described above for use in the preparation of the polyether polycarbonate block copolymers of the present invention may be employed.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The urethane reaction of polyisocyanate with the polyether polycarbonate block copolymer is advantageously carried out in the presence of an amount of a urethane-type catalyst which is effective to catalyze the reaction of the polyether polycarbonate block copolymer with the polyisocyanate. Preferably, the amount of urethane catalyst is an amount comparable to that used in conventional urethane-type reactions.

Any suitable urethane catalyst may be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylene diamine, N,N-diethyl-3-diethylaminopropylamine, dimethyl benzylamine and the like. Other suitable catalysts are, for example, tin compounds such as stannous chloride, tin salts of carboxylic acids such as dibutyltin di-2-ethyl hexoate, as well as other organometallic compounds such as are disclosed in U.S. Pat No. 2,846,408.

A wetting agent(s) of surface-active agent(s) is generally necessary for production of high grade polyurethane foam according to the present invention, since in the absence of same, the foams collapse or contain very large uneven cells. Suitable wetting agents are those which are soluble in the polyether polycarbonate block copolymers.

SPECIFIC EMBODIMENTS

The following examples are included for illustrative purposes only, and do not limit the scope of the invention or the claims. All parts and percentages are by weight unless otherwise stated.

Example 1

Preparation of Polyether Polycarbonate Block Copolymer

To a 1000-ml 3-neck flask is added 0.9 g of a polyether polyol corresponding to the formula

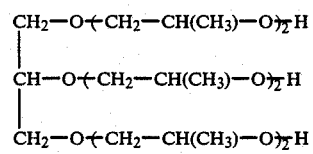

and 177 g of ethylene carbonate. The solution is heated at 190° C. for about 5.5 hours after which the evolution of gas from the reaction mixture ceases. An infrared scan on a sample shows a strong carbonyl stretch near 1745 cm$^{-1}$ and a strong C—O—C stretch at about 1260 cm$^{-1}$, indicating the presence of both ether units and carbonate ether units in the polymer. No absorptions at 1805 and 1775 cm$^{-1}$ are detected. Such absorptions are characteristic of ethylene carbonate. This indicates the reaction has gone to completion. The polyether polycarbonate block copolymer product obtained is a brown, viscous liquid weighing 93 g.

EXAMPLE 2

Preparation of Polyether Polycarbonate Block Copolymer

Into a 1000-ml 3-neck flask is placed 7.2 g of the polyether polyol described in Example 1 and 177 g of ethylene carbonate. The solution is heated at 150° C. for 23 hours under nitrogen. An infrared scan on the product indicates that the brown, viscous liquid contains both carbonate ether and ether units and no groups characteristic of ethylene carbonate. The polyether polycarbonate block copolymer product weighs 102 g and contains about 7 percent $CO_2$.

EXAMPLE 3

Preparation of Polyether Polycarbonate Block Copolymer

To a 1000-ml flask is added 176.9 g of a polyether polyol corresponding to the formula

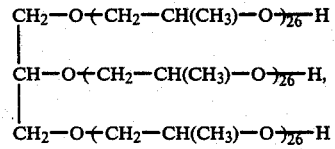

54.9 g of ethylene carbonate and 0.33 g of sodium stannate trihydrate. The mixture is heated at 156° C. under nitrogen for 14.75 hours until infrared analysis shows no ethylene carbonate is present. The product is heated at 100° C. for 1 hour with 3 g of magnesium silicate. The mixture is then filtered. The product weighs 211 g and contains 24 percent $CO_2$. The infrared analysis confirms the product has a polyethylene polycarbonate structure.

EXAMPLE 4

Preparation of Polyether Polycarbonate Block Copolymer

Ethylene carbonate (EC) and a polyol with a molecular weight of 450, prepared from glycerol and propylene carbonate in a mole ratio of 64 to 1, are weighed into a 2000-ml 3-neck flask equipped with a mechanical stirrer. To the solution is added 0.1 weight percent of $Na_2SnO_3.3H_2O$. The resulting mixture is heated under $N_2$ at 170° C. for 6 hours, at which time an infrared scan shows no ethylene carbonate still present. A 25 percent solution of the product is prepared in acetone. The initial solution is filtered through a ⅛" thick Celite ® pad to remove any precipitated catalyst. The clear solution is then stirred for 1 hour at room temperature with 10 g of magnesium silicate per 100 g of product. The solids are removed by filtration through Celite ® and the acetone removed on a rotovap at 70° C. The product is then dewatered by bubbling nitrogen through at 110° C. for 1 hour. The product is a slow-pouring yellow liquid with an equivalent weight of 833 (by percent OH analysis) and a viscosity of 62,692 centistokes.

EXAMPLE 5

Preparation of Polyurethane Foam from Polyether Polycarbonate Block Copolymer

Into a 1-quart cylindrical paper cup are placed 100 g of the product of Example 4, 4.30 ml of $H_2O$, 1.20 ml of L-532 ® surfactant (Union Carbide), 0.20 ml of Dabco 33LV ® (amine catalyst) and 0.06 ml of stannous octoate (tin catalyst). The solution is stirred for 30 seconds and 41.4 ml of toluene diisocyanate is added (TDI Index=1.10). The solution is stirred for 3 seconds and then transferred to a wide mouth paper cup. A flexible urethane foam is produced having a smooth texture with some external shape distortions and internal voids.

What is claimed is:

1. A polyether polycarbonate block copolymer comprising
   (a) the residue of a hydrocarbon or a hydrocarbyloxy hydrocarbon compound containing 3 or more functional groups with active hydrogens;
   (b) an alkylene polyether, polyamide, aromatic polycarbonate, polyester, aromatic polyether, polyimide, polysulfide, polysulfone or polysaccharide block wherein such a block is bonded to the residue of each active hydrogen-containing functional group; and
   (c) polyether polycarbonate blocks which comprise ether and carbonate ether units arranged in random order, wherein the polyether polycarbonate blocks are bonded to the blocks defined in (b).

2. The polyether polycarbonate block copolymer of claim 1 wherein the ether unit is a substituted or unsubstituted alkylene moiety bonded to an oxygen and the carbonate ether unit is a carbonyl group bonded to an ether unit.

3. The polyether polycarbonate block copolymer of claim 2 wherein the block (b) comprises a polyalkylene ether.

4. The polyether polycarbonate block copolymer of claim 3 wherein the polyalkylene ether block comprises unsubstituted or substituted ethylene moieties bonded to oxygen atoms.

5. The polyether polycarbonate block copolymer of claim 4 wherein block (b) further comprises between about 1 and 200 alkylene ether units.

6. The polyether polycarbonate block copolymer of claim 5 wherein block (c) comprises the residue of one or more alkylene carbonates.

7. The polyether polycarbonate block copolymer of claim 5 wherein block (c) comprises the residue of between about 1 and 1000 alkylene carbonates.

8. The polyether polycarbonate block copolymers of claim 1 wherein two or more polyether polycarbonate block copolymers are bridged by carbonyl moieties.

9. Polyether polycarbonate block copolymers corresponding to the formulas

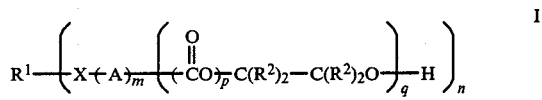

or

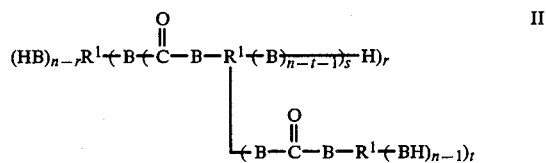

wherein
B is

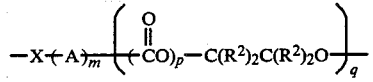

with the proviso that X is always bonded to $R^1$;

A is an alkylene ether, amide, aromatic carbonate, ester, imide, sulfide, sulfone or saccharide unit;

$R^1$ is separately in each occurrence an n valent hydrocarbon radical or hydrocarbyloxy hydrocarbon radical;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyl dioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is S, O, NH,

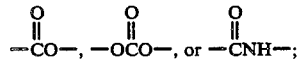

m is separately in each occurrence an integer of from 1 to 200;

n is separately in each occurrence an integer of from 3 to 25;

p is separately in each occurrence 0 or 1;

q is separately in each occurrence an integer of 1 or greater;

r is separately in each occurrence an integer of from 1 to 25;

s is separately in each occurrence an integer of from 1 to 20; and t is separately in each occurrence an integer of from 0 to 24.

10. The polyether polycarbonate block copolymer of claim 9 wherein $R^1$ is aliphatic or cycloaliphatic; $R^2$ is hydrogen, $C_{1-20}$ alkyl, $C_{1-20}$ haloalkyl, $C_{1-20}$ alkenyl, or phenyl; X is S, O, or NH; m is an integer of between 1 to 75 inclusive; n is an integer of 3 to 10 inclusive; q is an integer of 1 to 1000 inclusive; r is an integer of 2 to 10 inclusive; s is an integer of 1 to 10 inclusive; and t is an integer of 0 to 9 inclusive.

11. The polyether polycarbonate block copolymer of claim 10 wherein $R^1$ is an n valent alkane or n valent cycloalkane; $R^2$ is hydrogen, $C_{1-3}$ alkyl, $C_{2-3}$ alkenyl or phenyl; m is an integer of 3 to 50 inclusive; n is an integer of 3 to 5 inclusive; q is an integer of 1 to 500 inclusive; r is 1 or 2; s is an integer of 1 to 4 inclusive; and t is an integer of 0 to 4 inclusive.

12. The polyether polycarbonate block copolymer of claim 11 wherein $R^1$ is a n valent $C_{1-10}$ alkane; and $R^2$ is hydrogen, methyl or ethyl.

13. The polyether polycarbonate block copolymer of claim 12 wherein A is an alkylene ether unit.

14. The polyether polycarbonate block copolymer of claim 13 wherein the alkylene ether unit corresponds to the formula $-C(R^2)_2-C(R^2)_2-O-$.

15. A polyether polycarbonate block copolymer prepared by the process which comprises contacting (a) a hydrocarbon or hydrocarbyloxy hydrocarbon substituted with between about 3 and 25 reactive hydrogen-containing functional groups wherein an alkylene polyether, polyamide, aromatic polycarbonate, polyester, aromatic polyether, polyimide, polysulfide, polysulfone or a polysaccharide block is bonded to each active hydrogen-containing functional group; with (b) one or more moles of an alkylene carbonate per block attached to a functional group, under conditions such that a polyether polycarbonate block copolymer is prepared.

16. The polyether polycarbonate block copolymer of claim 15 wherein the contacting occurs in the presence of a catalytic amount of an ester exchange catalyst at a temperature of between about 125° and 200° C.

17. The polyether polycarbonate block copolymer of claim 16 which involves contacting between about 1 and 1000 moles of alkylene carbonate with each block bonded to an active hydrogen containing functional group.

18. A process for the preparation of a polyether polycarbonate block copolymer which comprises contacting (a) hydrocarbon substituted with between about 3 and 25 reactive hydrogen-containing functional groups wherein each reactive hydrogen-containing functional group is further bonded to an alkylene polyether, polyamide, aromatic polycarbonate, polyester, aromatic polyether, polyimide, polysulfide, polysulfone or a polysaccharide block with (b) one or more moles of an alkylene carbonate per block attached to a reactive functional group, at a temperature of between 125° C. and 200° C. under conditions such that a polyether polycarbonate block copolymer is prepared.

19. The process of claim 18 wherein the contacting occurs in the presence of a catalytic amount of an ester exchange catalyst.

20. The process of claim 19 wherein between about 1 and 1000 inclusive moles of alkylene carbonate per block bonded to a reactive functional group is contacted.

21. The process of claim 20 wherein between about 1 and 500 moles or alkylene carbonate per block connected to a reactive functional group is contacted.

22. The process of claim 21 wherein the temperature is between about 150° C. to 180° C.

23. The process of claim 21 wherein the amount of the ester exchange catalyst is between about 0.01 to 5 percent by weight.

24. The process of claim 23 wherein the amount of the ester exchange catalyst is between about 0.1 and 1.0 weight percent.

25. The process of claim 24 wherein the catalyst is an alkali metal carbonate, an alkali metal metaborate or an alkali metal stannate.

26. A polyether polycarbonate block copolymer comprising:
(a) the residue of a hydrocarbon or a hydrocarbyloxy hydrocarbon compound containing 3 or more functional groups with active hydrogens;
(b) an alkylene polyether block wherein such block is bonded to the residue of each active hydrogen-containing functional group; and
(c) polyether polycarbonate blocks which comprise ether and carbonate ether units arranged in random order, wherein the polyether polycarbonate blocks are bonded to the blocks defined in (b) and the ether unit is a substituted or unsubstituted alkylene moiety bonded to an oxygen and the carbonate ether unit is a carbonyl group bonded to an ether unit.

27. The polyether polycarbonate block copolymer of claim 26 wherein the polyalkylene ether block comprises unsubstituted or substituted ethylene moieties bonded to oxygen atoms.

28. The polyether polycarbonate block copolymer of claim 27 wherein block (b) further comprises between about 1 and 200 alkylene ether units.

29. The polyether polycarbonate block copolymer of claim 28 wherein block (c) comprises the residue of one or more alkylene carbonates.

30. The polyether polycarbonate block copolymer of claim 28 wherein block (c) comprises the residue of between 1 and 1000 alkylene carbonates.

31. The polyether polycarbonate block copolymers of claim 26 wherein two or more polyether polycarbonate block copolymers are bridged by carbonyl moieties.

32. Polyether polycarbonate block copolymers corresponding to the formulas

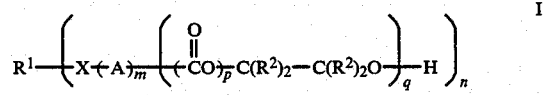

I or

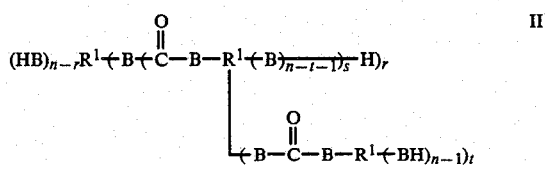

II wherein
B is

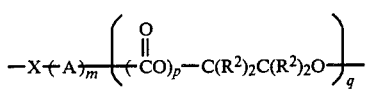

with the proviso that X is always bonded to $R^1$;

A is an alkylene ether unit;

$R^1$ is separately in each occurrence an n valent hydrocarbon radical or hydrocarbyloxy hydrocarbon radical;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyl dioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is S, O, NH,

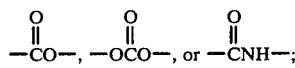

m is separately in each occurrence an integer of from 1 to 200;

n is separately in each occurrence an integer of from 3 to 25;

p is separately in each occurrence 0 to 1;

q is separately in each occurrence an integer of 1 or greater;

r is separately in each occurrence an integer of from 1 to 25;

s is separately in each occurrence an integer of from 1 to 20; and t is separately in each occurrence an integer of from 0 to 24.

33. The polyether polycarbonate block copolymer of claim 32 wherein the alkylene ether unit corresponds to the formula $—C(R^2)_2—C(R^2)_2—O—$.

* * * * *